US009134792B2

(12) United States Patent
Forutanpour et al.

(10) Patent No.: US 9,134,792 B2
(45) Date of Patent: Sep. 15, 2015

(54) LEVERAGING PHYSICAL HANDSHAKING IN HEAD MOUNTED DISPLAYS (71) Applicant: QUALCOMM Incorporated, San Diego, CA (US)

(72) Inventors: Babak Forutanpour, Carlsbad, CA (US); Shivakumar Balasubramanyam, San Diego, CA (US); Vitor R. Carvalho, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 315 days.

(21) Appl. No.: 13/740,432

(22) Filed: Jan. 14, 2013

(65) Prior Publication Data
US 2014/0198956 A1 Jul. 17, 2014

(51) Int. Cl.
G06K 9/00 (2006.01)
G06F 3/01 (2006.01)

(52) U.S. Cl.
CPC .......... G06F 3/011 (2013.01); G06F 3/012 (2013.01); G06F 3/015 (2013.01); G06F 3/017 (2013.01); G06K 9/00221 (2013.01); G06K 9/00295 (2013.01); G06K 9/00355 (2013.01)

(58) Field of Classification Search
None
See application file for complete search history.

(56) References Cited

U.S. PATENT DOCUMENTS 6,038,333 A * 3/2000 Wang .......................... 382/118
8,090,159 B2 1/2012 Gabara
2011/0054360 A1 3/2011 Son et al.
2011/0221672 A1 9/2011 Osterhout et al.
2012/0143028 A1 6/2012 Park et al.
2012/0249797 A1 10/2012 Haddick et al.

FOREIGN PATENT DOCUMENTS

| EP | 1394665 A1 | 3/2004 |
| EP | 2410490 A2 | 1/2012 |
| WO | 2012003844 A1 | 1/2012 |
| WO | 2012077909 A2 | 6/2012 |

OTHER PUBLICATIONS

Fortino et al., "A Cooperative Approach for Handshake Detection based on Body Sensor Networks", In Proc. of 2010 IEEE International Conference on Systems, Man, and Cybernetics, Istanbul, Turkey, Oct. 2010, 8 pages total.*
International Search Report and Written Opinion—PCT/US2014/011280—ISA/EPO—Apr. 28, 2014.

* cited by examiner

Primary Examiner — Brian P Werner
(74) Attorney, Agent, or Firm — Jeffrey D. Jacobs (57) ABSTRACT A system, a method, and a computer program product for managing information for an interface device are provided. The system detects for one of a present physical encounter between a user of the interface device and a person, and a non-physical encounter between the user and a person. The system determines if a detected present physical encounter is an initial encounter or a subsequent encounter, and adds content associated with the person to a database of previously encountered persons when the present physical encounter is an initial encounter. When the present physical encounter is a subsequent encounter or a present non-physical encounter is detected, the system determines if the person is known by the user, and presents information to the interface device corresponding to the person when the person is not known by the user.

44 Claims, 6 Drawing Sheets

LEVERAGING PHYSICAL HANDSHAKING IN HEAD MOUNTED DISPLAYS

BACKGROUND

1. Field

The present disclosure relates generally to use interface devices having head mounted displays (HMD), such as augmented reality (AR) glasses, and more particularly to the management of information presented through such devices.

2. Background

Systems and applications for implementing augmented reality have become very popular and widespread. AR systems typically include a head mounted display that allows a user to simultaneously see and interact with his surroundings while interacting with applications, such as e-mail and media players. Although many AR applications may be run on smartphones and tablets, the most natural form factor for implementing AR systems are optical devices, such as head mounted displays in the form of AR glasses.

One AR system feature that users may desire is the ability to remember and recall faces of people the user has previously met or encountered. Currently, some AR systems find faces in the field of view using a front facing camera, also referred to as a scene camera. The system use facial recognition software to identify familiar faces and to label each recognized face on a display of the AR system. The downside of this is that the AR system can potentially label each face in the field of view thereby displaying a large amount of irrelevant information that clutters the display. Information may be irrelevant because the user may already know a particular person and thus has no need for the AR system to identify that person.

SUMMARY

A system, a method, and a computer program product for managing information for an interface device are provided. The system detects for one of a present physical encounter between a user of the interface device and a person, and a non-physical encounter between the user and a person. The system determines if a detected present physical encounter is an initial encounter or a subsequent encounter, and adds content associated with the person to a database of previously encountered persons when the present physical encounter is an initial encounter. When the present physical encounter is a subsequent encounter or when a present non-physical encounter is detected, the system determines if the person is known by the user. If the person is not known by the user, the system presents information to the interface device corresponding to the person.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of an AR system will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
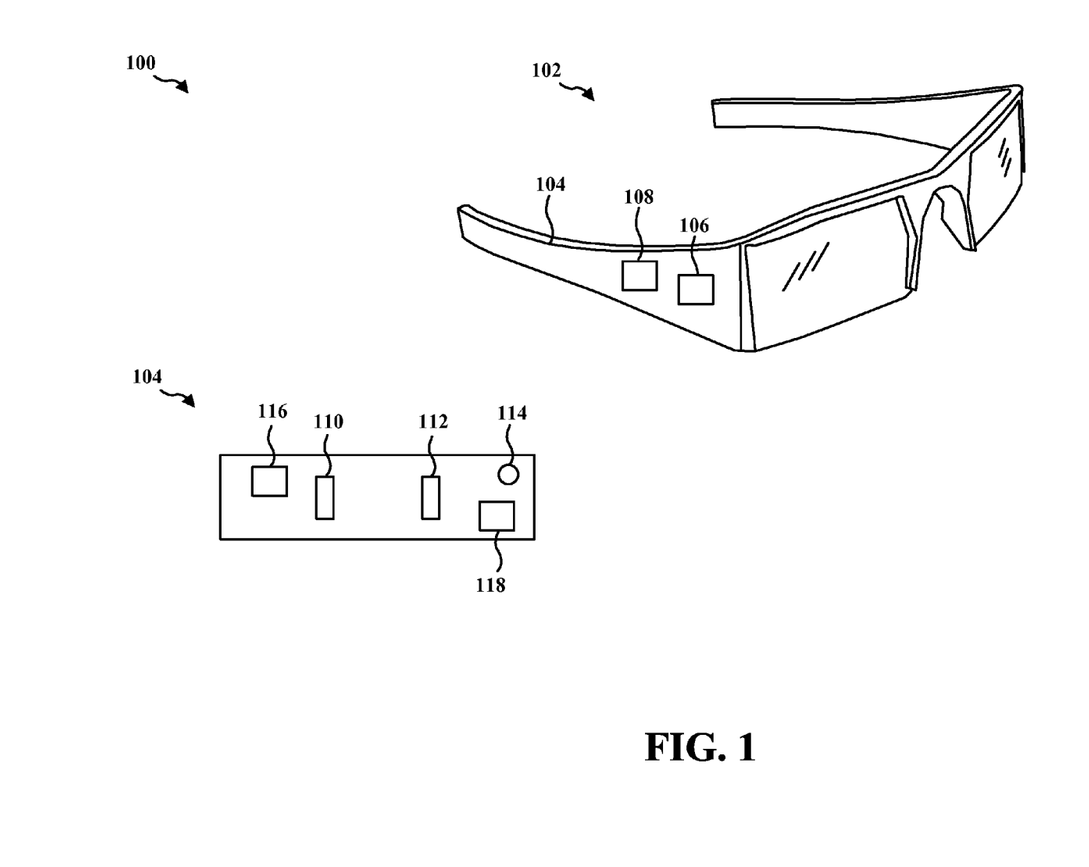
FIG. 1 is a diagram illustrating an AR system including a user interface device in the form of a pair of AR glasses, and a physical encounter detection device in the form of a wristband.

FIG. 1 is a diagram illustrating an AR system 100 that includes a user interface device 102 and a physical encounter detection device 104. The user interface device 102 illustrated is a pair of AR glasses configured to project content through its lenses using methods known in the art. For example, the AR glasses 102 may be configured to project application content through its lenses, such as e-mails, documents, web pages, or media content such as video games, movies or electronic books. Other types of user interface devices 102 may include Smartphones, tablets, laptops, etc.

The AR glasses 102 include a communications device 106 for communicating with the physical encounter detection device 104. The communications device 106 may be, for example, a Bluetooth device. The AR glasses 102 further include a processor 108 for processing and managing information for display in response to communications/signals received from the physical encounter detection device 104.

The encounter detection device 104 is configured to be associated with a body part and may be any form conducive to provide such association. For example, if the body part is a hand or finger, the physical encounter detection device may be configured as a wristband 104, as illustrated in FIG. 1. In one configuration, the physical encounter detection device 104 includes a pair of electrodes 110, 112 that provide EMG sensing capability, a motion sensor 114 and a communication device 116 for communicating with the user interface device 102. The encounter detection device 104 also includes a processor 118 for processing signals provided by the various sensors. The sensors 110, 112, 114 in combination with the processor 118 provide physical encounter detection capabilities as explained further below.

The electrodes 110, 112 are preferably positioned on the wristband such that when the user is wearing the wristband 104 the electrodes are located so as to sense electrical activity resulting from muscular movement of the wrist, indicating, for example, an action closely associated with a handshake, such as gripping. The electrodes 110, 112 in combination with an EMG sensing element of the processor 118, function as an EMG sensor that provides signals indicative of a particular action. The EMG sensing capability is based on well known technology.

The motion sensor 114 may be positioned anywhere on the wristband and provides signals indicative of an additional action closely associated with a handshake, such as up and down arm movement. The motion sensor 114 may be an accelerometer, gyroscope, magnetometer, or other such devices.

The AR system 100 manages information relative to a user's interactions with other people. To this end, the system catalogs attributes, e.g., faces, and information, e.g., names, of people whom the user has just met, for later retrieval when the user encounters a person whom he has previously met but does not remember. The cataloging aspect of the system is an ongoing process and in summary involves detecting an encounter indicative of an encounter with a person the user has just met. Such detection may occur when the system detects a handshake by the user premised on the assumption that a user shakes hands with a person he is meeting for the first time. For example, the physical encounter detection device 104 of the AR system 100 may monitor for an elevated EMG signal matching the characteristics of EMG signal corresponding to a handshake. When this detection occurs, the physical encounter detection device 104 may check accelerometer data to see if that data also shows the user is not just moving his hands in the air, but doing a repeated action corresponding to a handshake, e.g., squeezing and moving an object up and down, with the hand oriented similar to a holding a gun.

If the above two conditions are true, i.e., a sensed EMG signal indicates a possible handshake and the accelerometer data confirms a handshake, the physical encounter detection device 104 communicates to the user interface device 102 that a physical encounter between the user and a person has occurred. The user interface device 102 then takes a picture using its scene camera to capture an image of the person the user is encountering. The user interface device 104 then checks a face database that includes images of people that the user has previously encountered. If the face is not found in the face database, it is added to the database. Adding the face may include storing the image of the person along with an audio and/or video recording of the initial encounter with the person, and storing the image along with an audio recording of the person's name.

The retrieving aspect of the system involves tracking faces in the field of view of the AR glasses throughout the day. If the image of a face in the field of view is greater than x percent of the field of view, where a larger percentage corresponds to a larger image, which in turn corresponds to the face being closer to the user, the user interface device 102 takes a picture (captures an image) of the face using the scene camera, and determines if the face is already in the face database, for example, through image comparison. If the face is already in the database, then the user interface device 102 performs a look-up, i.e., determines if the user has marked this face as a known face. If the face is not a known face, then the user interface device 102 retrieves and displays content stored with this face, e.g., name, when user met the person, a thumbnail of that encounter, a video of the encounter.

Figure 2:
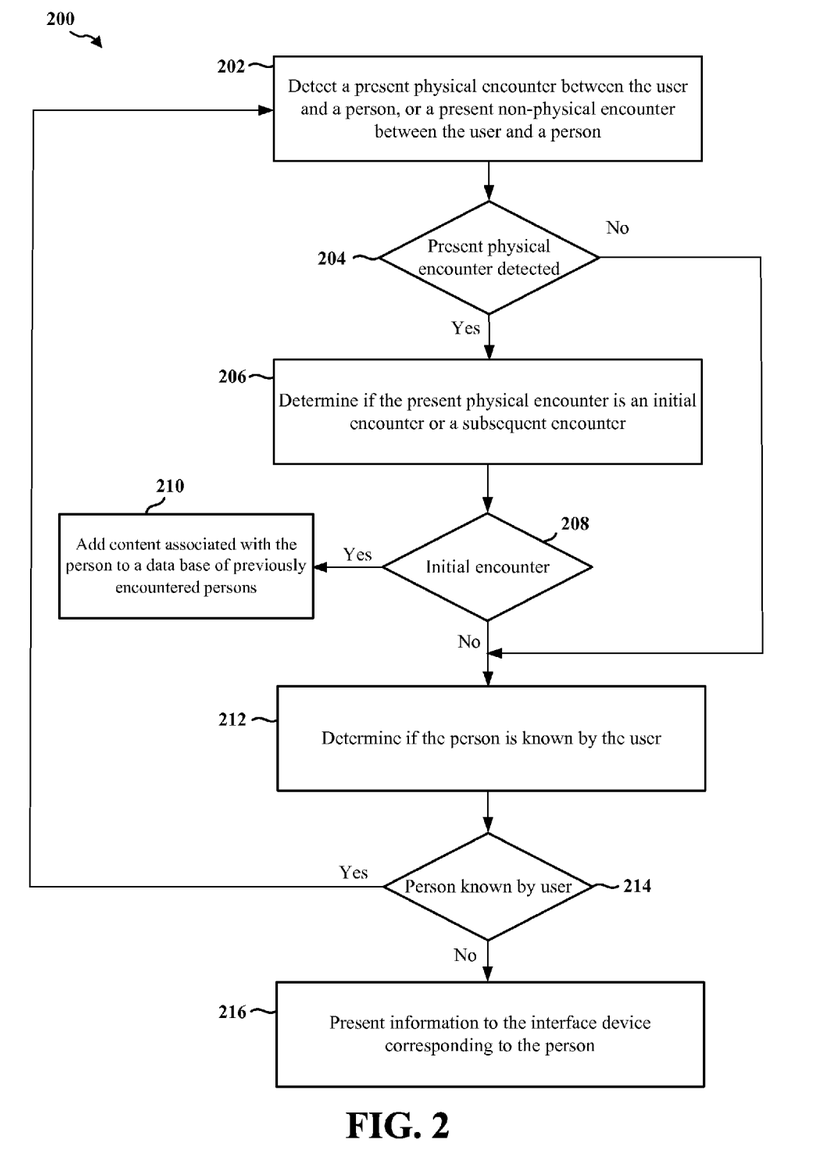
FIG. 2 is a flow chart of a method of managing information for display on a user interface device.

FIG. 2 is a flow chart detailing the above method of managing information for a user interface device. As mentioned, the process is directed toward detecting encounters between a user and a person and making intelligent choices with respect to the presentation of information, if any, about that person. The process may be performed by the AR system of FIG. 1. To this end, at step 202 a physical encounter detection device 104 detects for a present physical encounter between a user of the user interface device 102 and a person, while components of the user interface device 102 detect for a non-physical encounter between the user and a person.

Regarding detection of a present physical encounter, the physical encounter detection device 104 detects for such an encounter based one or more of sensed electrical activity of the user's body and motion of the user's body. In one configuration, the physical encounter detection device 104 initially checks for muscular electrical activity indicative of a first action generally corresponding to physical contact between the user and a person. Once this first action is detected, the physical encounter detection device 104 checks for motion activity indicative of a second action generally corresponding to a physical interaction between the user and the person. The first action may be, for example, a gripping of an object by the user, while the second action may be a shaking of the object. Collectively, the first action and the second action may be considered to correspond to a handshake interaction between the user and a person, where the first action is the user gripping the hand of the person and the second action is the user shaking the person's hand. This is merely one example of first and second actions and a corresponding interaction.

Figure 3:
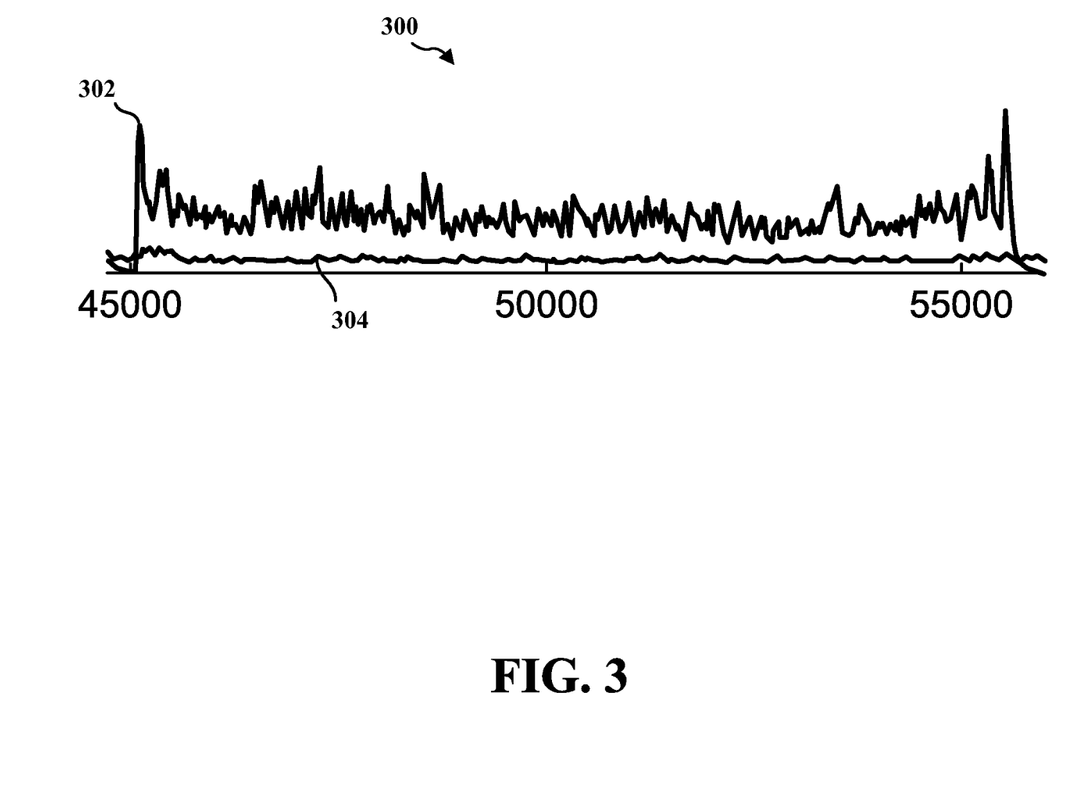
FIG. 3 is a graph illustrating changes in an output of an EMG sensor corresponding to a user holding and slightly squeezing an object.

As mentioned above, detection of the first action may be done using the EMG sensor described above. FIG. 3 is a graph 300 illustrating EMG signal amplitude as a function of time as the user grips the hand of another person. The waveform shows the user's hand muscles doing more work than in a relaxed state. The highly fluctuating waveform 302 is representative of a particular action of a user. In this case, the action corresponds to the user holding slightly and squeezing an object. This action may be interpreted as a potential handshake between the user and a person. The relatively flat waveform 304 represents a noise floor. Based on experimental EMG signal data, criterions indicative of a particular first action may be established. For example, the peak-to-peak voltage, the dynamic range or frequency of EMG signals measured during the action may serve as a criterion against which measurements of later obtained EMG signals may be compared. In this regard, the physical encounter detection device 104 may be trained for individual users by recording several EMG signals while the user is holding slightly and squeezing another person's hand and creating a template from those samples. The processor 118 of the physical encounter detection device 104 compares measurements of the obtained signal to a threshold defined by the experimental data. If or when the threshold is satisfied, the processor 118 concludes the first action occurred. If or when the threshold is not satisfied, the processor 118 concludes that the first action did not occur.

Figure 4:
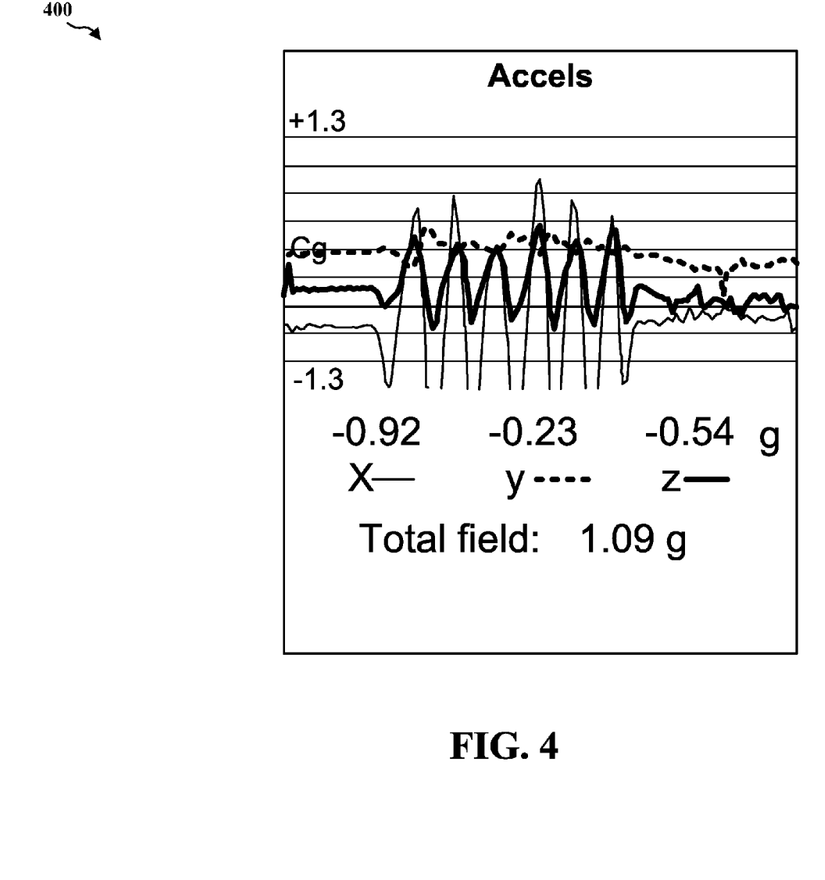
FIG. 4 is a graph illustrating changes in accelerometer output corresponding to an action, e.g., a handshake.

As mentioned above, detection of the second action may be done using the motion sensor described above. FIG. 4 is a graph 400 illustrating motion sensor, e.g., accelerometer, signals as a function of time, wherein the signals correspond to a particular action by a user, in this case the user moving his hand up and down in a motion corresponding to a handshake. There is strong and correlated frequency component in both the x axis and z axis channels, with a minimal frequency component along the y axis, which is the axis parallel to the arm's length. This is merely one of many motion signal forms or action templates that may be obtained experimentally.

The processor 118 includes a library of these action templates and compares obtained motion sensor signals against the library of action templates. If the form of the obtained motion signal closely matches one of the action templates, the processor 118 concludes that the action occurred. The level of closeness between the obtained motion signals and the action template defines the criterion described above. For example, point-by-point voltage comparisons, or waveform area comparison of an obtained motion signal and an action template may yield a percentage match between the waveform. In this case, the criterion may be percentage, e.g., 90%, and a yielded percentage at or above the criterion may be considered to result in action detection.

Regarding detection of a present non-physical encounter, components of the user interface device 102 detects for a close proximity between a user of the user interface device and a person, based on an attribute of the person. In one configuration, the user interface device 102, e.g. AR glasses, determines if an image of a person in the field of view of the glasses satisfies a criterion corresponding to a close spatial relationship between the user and the person. For example, a scene camera component of user interface device 102 may capture an image of a person in the field of view. The processor 108 of the AR glasses may identify the facial portion of the image; determine the size of the facial portion relative to the size of a lens of the AR glasses; and conclude there is a close spatial relationship between the user and the person if the size satisfies a threshold criterion. For example, the threshold may be set at 30%, in which case the threshold is satisfied if the facial portion of the image takes up at least 30% of the display.

In another configuration, a microphone component of the user interface device 102 may capture a sound of the person, for example the person's voice; determine the level of the sound in decibels and conclude there is a close spatial relationship between the user and the person if or when the sound level satisfies a threshold criterion. For example, the threshold may be set at 50 dB, in which case the threshold is satisfied if or when the sound level of the person is at least 50 dB.

In yet another configuration, the user interface device 102 detects for a close proximity between a user of the interface device and a person, based on both image and sound. In this case, the image capturing component, e.g., camera, of the user interface device 102 is maintained in a low or off power mode, while the lower power consuming sound capturing component, e.g., microphone, of the user interface device is kept in an on power mode. Upon capture of a sound at a level that exceeds a threshold, such as the level of the user's normal voice, the camera turns on and captures a picture. The processor 108 of the user interface device 102 proceeds with analyzing the image size as described above.

At step 204, if or when a present physical encounter is not detected, i.e., a non-physical encounter is detected, the process proceeds to step 212, where the processor 108 of the user interface device 102 determines if the person is known by the user. Details of this step are described further below. If, however, at step 204 a present physical encounter is detected, the physical encounter detection device 104 sends a signal to the user interface device 102 indicating such detection and the process proceeds to step 206 where the user interface device 102 determines if the present physical encounter is an initial encounter or a subsequent encounter. For example, the user interface device 102 may capture an image of the person in its field of view. The processor 108 compares the captured image to images in a database of images of people previously encountered by the user. If or when the image of the person in the field of view does not match an image in the database, the processor 108 concludes the present physical encounter is an initial encounter. On the other hand, if or when the image of the person does match an image in the database the processor 108 concludes the present physical encounter is a subsequent encounter.

At step 208, if or when the present physical encounter is an initial encounter, the process proceeds to step 210 where content associated with the person is added to a database of previously encountered persons. Such content may be an image of the person captured during the initial encounter, a sound recording of a conversation between the user and the person during the initial encounter, or a video of the initial encounter. Content is collected using well known techniques and is stored in a database as a catalog of prior contacts. The user may subsequently add information to entries in the catalog further identifying the person or the nature and circumstances of the encounter. This information may be in the form of text or an audio recording. The user may also tag certain persons as being known by the user. Steps 206, 208 and 210 of the process collectively provide for cataloging and creation of a library of persons encountered by the user and, as a subset, persons known by the user.

At step 208, if or when the present physical encounter is not an initial encounter, in other words the present physical encounter is a subsequent encounter, the process proceeds to step 212 where the system determines if the person is known by the user. As mentioned above, step 212 is also performed when a non-physical encounter is detected at step 204. If not already captured, the user interface device 102 captures an image of the person. The processor 108 than scans the database for a matching image. Once located, the processor 108 determines if the person is tagged as being known by the user.

At step 214, if or when the person is not known by the user, the process proceeds to step 216 where the processor 108 presents information to the interface device corresponding to the person. Presenting information through the user interface device 102 involves scanning the database for information associated with an image in the database that matches the image of the person. This information may include at least one of an identification of the person (e.g., person's name, occupation, employer, residence, etc.), and a summary of a previous encounter between the user and the person (e.g., date and location of pervious encounter). This information may be presented through a display, e.g., lens, or speaker of the user interface device 102 in the form of text, pictures, video or sound.

Figure 5:
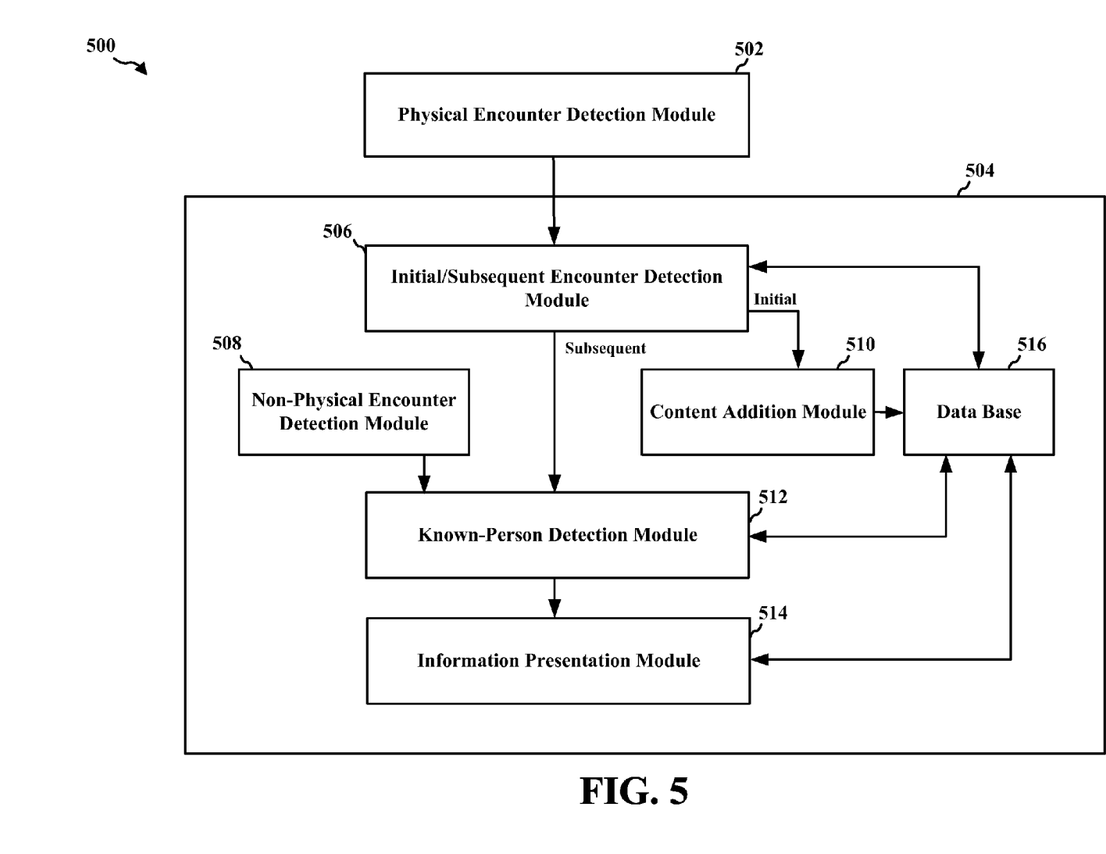
FIG. 5 is a conceptual flow diagram illustrating the operation of different modules/means/components in an exemplary AR system.

FIG. 5 is a conceptual flow diagram illustrating the operation of different modules/means/components in an exemplary system 500 and the modules/means/components in each apparatus of the system. The system 500 includes a physical encounter detection module 502 and a user interface device 504. The encounter detection module 502 and the user interface 504 may communicate by a wired connection or by wireless communication using a common communication protocol, such as Bluetooth. The user interface device 504 includes an initial/subsequent encounter detection module 506, a non-physical encounter detection module 508, a content addition module 510, a known-person detection module 512, an information presentation module 514 and a database 516.

The physical encounter detection module 502 detects for a present physical encounter between a user of the interface device and a person. In one configuration, this module 502 includes one or more of the components, e.g., motion sensor, EMG sensor, processor, described above with respect to the physical encounter detection device 104 of FIG. 1. The non-physical encounter detection module 508 detects for a non-physical encounter between the user and a person. In one configuration, this module 508 includes one or more of the components, camera, microphone, processor, database, described above with respect to the user interface device 102 of FIG. 1.

The initial/subsequent encounter detection module 506 determines if a detected present physical encounter is an initial encounter or a subsequent encounter. The content addition module 510 adds content associated with the person to a database of previously encountered persons when the present physical encounter is an initial encounter. The known-person detection module 512 determines if the person is known by the user when the present physical encounter is a subsequent encounter or a present non-physical encounter is detected. The information presentation module 514 presents information to the interface device corresponding to the person when the person is not known by the user. The database 516 stores information corresponding to people whom the user has encountered. Information stored may include information of all people the user has encountered, whether known or not, or only storage of people encountered but not known by the user.

The system 500 and its apparatuses 502, 504 may include additional modules that perform each of the steps of the algorithm in the aforementioned flow chart of FIG. 2. As such, each step in the aforementioned flow chart of FIG. 2 may be performed by a module and an apparatus 502, 504 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 6:
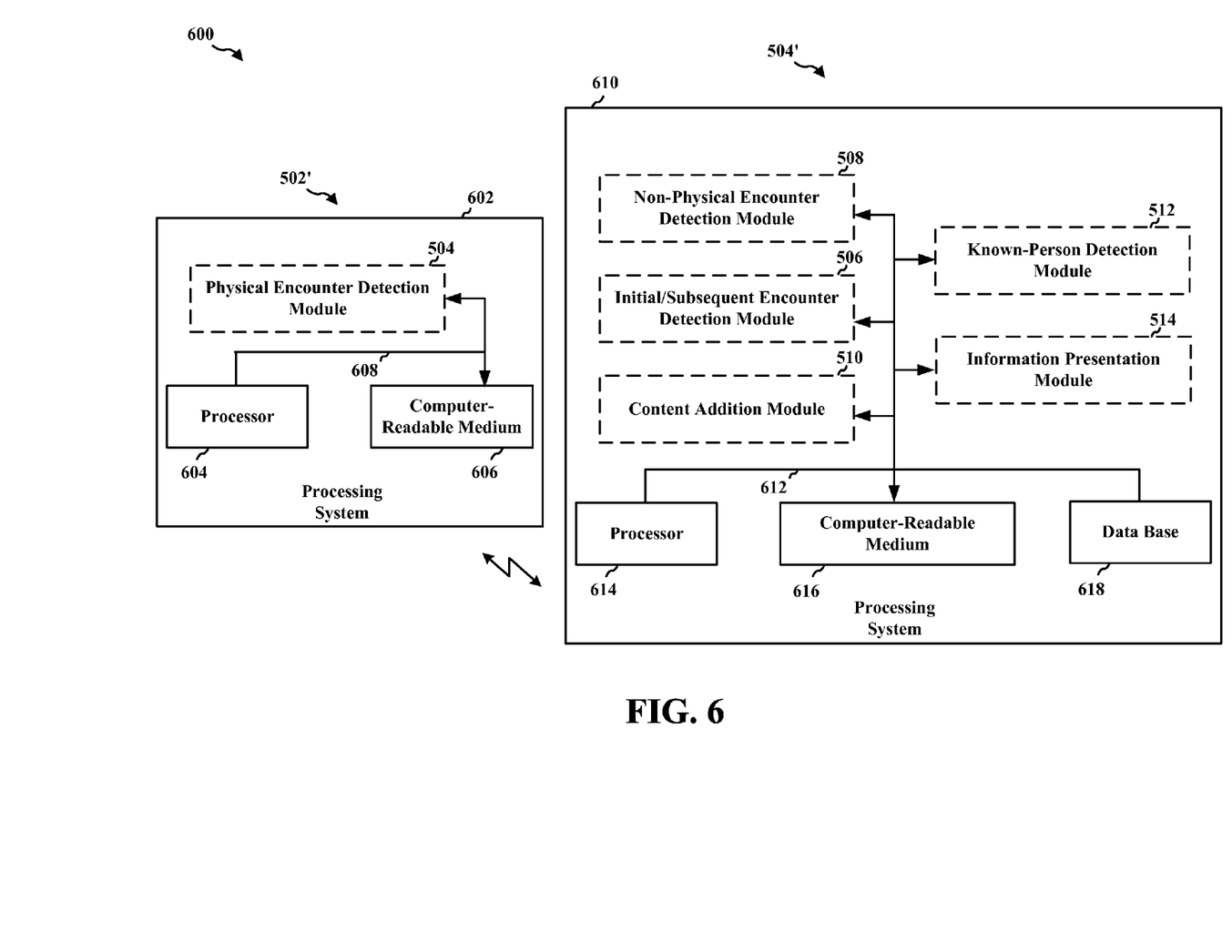
FIG. 6 is a diagram illustrating an example of a hardware implementation for an AR system employing a processing system.

FIG. 6 is a diagram illustrating an example of a hardware implementation for a system 600 having a first apparatus 502' employing a first processing system 602, and a second apparatus 504' employing a second processing system 610. Regarding the first apparatus 502', the first processing system 602 may be implemented with a bus architecture, represented generally by the bus 608. The bus 608 may include any number of interconnecting buses and bridges depending on the specific application of the first processing system 602 and the overall design constraints. The bus 608 links together various circuits including one or more processors and/or hardware modules, represented by the processor 604, the module 504, and the computer-readable medium 606. The bus 608 may also link various other circuits such as timing sources, peripherals, voltage regulators, and power management circuits, which are well known in the art, and therefore, will not be described any further.

The first processing system 602 includes a processor 604 coupled to a computer-readable medium 606. The processor 604 is responsible for general processing, including the execution of software stored on the computer-readable medium 606. The software, when executed by the first processor 604, causes the first processing system 602 to perform the various functions described supra for the physical encounter detection apparatus. The computer-readable medium 606 may also be used for storing data that is manipulated by the processor 604 when executing software. The first processing system 602 further includes module 504. The module may be a software module running in the processor 604, resident/stored in the computer readable medium 606, one or more hardware modules coupled to the processor 604, or some combination thereof.

In one configuration, the apparatus 502/502' includes means for detecting for a non-physical encounter between the user and a person. Such means may include one or more components, e.g. camera, microphone, and processor, of the user interface device 102, that are collectively configured to determine if an attribute of a person satisfies a criterion corresponding to a close spatial relationship between the user and the person. The aforementioned means may be one or more of the aforementioned modules of the apparatus 502 and/or the processing system 602 of the apparatus 502' configured to perform the functions recited by the aforementioned means.

Regarding the second apparatus 504', the processing system 610 may be implemented with a bus architecture, represented generally by the bus 612. The bus 612 may include any number of interconnecting buses and bridges depending on the specific application of the processing system 610 and the overall design constraints. The bus 612 links together various circuits including one or more processors and/or hardware modules, represented by the processor 614, the modules 504, 506, 508, 510, 512, the computer-readable medium 616, and the database 618. The bus 612 may also link various other circuits such as timing sources, peripherals, voltage regulators, and power management circuits, which are well known in the art, and therefore, will not be described any further.

The processing system 610 includes a processor 614 coupled to a computer-readable medium 616. The processor 614 is responsible for general processing, including the execution of software stored on the computer-readable medium 616. The software, when executed by the processor 614, causes the processing system 610 to perform the various functions described supra for the user interface device apparatus. The computer-readable medium 616 may also be used for storing data that is manipulated by the processor 614 when executing software. The processing system further includes at least one of the modules 506, 508, 510, 512, 514. The modules may be software modules running in the processor 614, resident/stored in the computer readable medium 616, one or more hardware modules coupled to the processor 614, or some combination thereof.

In one configuration, the second apparatus 504/504' includes means for detecting for one of a present physical encounter between a user of the interface device and a person. The apparatus 504/504' also includes means for determining if a detected present physical encounter is an initial encounter or a subsequent encounter, means for adding content associated with the person to a database of previously encountered persons when the present physical encounter is an initial encounter, and means for determining if the person is known by the user when the present physical encounter is a subsequent encounter or a present non-physical encounter is detected. The apparatus 504/504' further includes means for presenting information to the interface device corresponding to the person when the person is not known by the user. The second apparatus 504/504' may also include means for receiving a signal from the first apparatus 502/502' indicating that a physical encounter has been detected. The means for receiving may be a communications device configured to communicate with a communications device of the first apparatus 502/502'. For example, the receiving means may be a Bluetooth device paired with a Bluetooth device of the first apparatus 502/502'. The aforementioned means may be one or more of the aforementioned modules of the apparatus 504 and/or the processing system 610 of the apparatus 504' configured to perform the functions recited by the aforementioned means.

Additional methods, apparatuses and computer program products based on elements and feature of the foregoing FIGS. 2, 5 and 6 may include an apparatus, e.g., a user interface device, for managing information. An exemplary apparatus includes modules/means/components that receive an indication of a detection of a present physical encounter between a user of the interface device and a person, determine if the present physical encounter is an initial encounter or a subsequent encounter, and add content associated with the person to a database of previously encountered persons when the present physical encounter is an initial encounter.

Additional methods, apparatuses and computer program products based on elements and features of the foregoing FIGS. 2, 5 and 6 may include an apparatus, e.g., a wristband, for detecting a physical interaction between a user of a detection device and another person. An exemplary apparatus includes modules/means/components that determine if electrical activity sensed from a body part of the user is indicative of a first action by the user associated with the physical interaction, and determine if motion activity sensed from a body part of the user is indicative of a second action by the user associated with the physical interaction It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of managing information for an interface device, said method comprising:
   detecting for one of a present physical encounter between a user of the interface device and a person, and a non-physical encounter between the user and a person;
   if a present physical encounter is detected, determining if the present physical encounter is an initial encounter or a subsequent encounter;
   if the present physical encounter is an initial encounter, adding content associated with the person to a database of previously encountered persons;
   if the present physical encounter is a subsequent encounter or if a present non-physical encounter is detected, determining if the person is known by the user; and
   if the person is not known by the user, presenting information to the interface device corresponding to the person.

2. The method of claim 1, wherein detecting a present physical encounter comprises one or both of:
   determining if electrical activity sensed from a body part of the user is indicative of a first action of the user; and
   determining if motion activity sensed from a body part of the user is indicative of a second action of the user.

3. The method of claim 2, wherein determining if sensed electrical activity is indicative of a first action comprises:
   comparing the sensed electrical activity to a criterion of electrical activity corresponding to the first action; and
   concluding the first action occurred when the criterion is satisfied.

4. The method of claim 2, wherein determining if sensed motion activity is indicative of a second action comprises:
   comparing the sensed motion activity to a criterion of motion activity corresponding to the second action; and
   concluding the second action has occurred when the criterion is satisfied.

5. The method of claim 2, wherein the first action comprises gripping and the second action comprises up and down movement.

6. The method of claim 1, wherein detecting a present non-physical encounter comprises determining if an attribute of a person satisfies a criterion corresponding to a close spatial relationship between the user and the person.

7. The method of claim 1, wherein the attribute comprises one or more of an image of the person or a sound of the person.

8. The method of claim 1, wherein determining if the present physical encounter is an initial encounter or a subsequent encounter comprises:
   comparing an image of the person to images in a database of images of people previously encountered by the user;

concluding the present physical encounter is an initial encounter if the image of the person does not match an image in the database; and concluding the present physical encounter is a subsequent encounter if the image of the person does match an image in the database.

9. The method of claim 1, wherein determining if the person is known by the user comprises:

obtaining a present attribute of the person; and scanning a database of known persons for a tag associated with an attribute in the database that matches the present attribute of the person, wherein the tag indicates that the person is known by the user.

10. The method of claim 9, wherein the present attribute comprises at least one of an image of the person and a sound of the person.

11. The method of claim 1, wherein presenting information to the interface device comprises scanning a database for information associated with an attribute in the database that matches an attribute of the person, wherein the information includes at least one of an identification of the person and a summary of a previous encounter between the user and the person.

12. The method of claim 11, wherein the information is presented as one or more of images, audio or video.

13. A system for managing information for an interface device, said system comprising:

means for detecting for one of a present physical encounter between a user of the interface device and a person;

means for detecting a non-physical encounter between the user and a person;

means for determining if a detected present physical encounter is an initial encounter or a subsequent encounter;

means for adding content associated with the person to a database of previously encountered persons when the present physical encounter is an initial encounter;

means for determining if the person is known by the user when the present physical encounter is a subsequent encounter or a present non-physical encounter is detected; and means for presenting information to the interface device corresponding to the person when the person is not known by the user.

14. The system of claim 13, wherein the means for detecting a present physical encounter comprises one or both of:

means for determining if electrical activity sensed from a body part of the user is indicative of a first action of the user; and means for determining if motion activity sensed from a body part of the user is indicative of a second action of the user.

15. The system of claim 14, wherein the means for determining if sensed electrical activity is indicative of a first action is configured to:

compare the sensed electrical activity to a criterion of electrical activity corresponding to the first action; and conclude the first action occurred when the criterion is satisfied.

16. The system of claim 14, wherein the means for determining if sensed motion activity is indicative of a second action is configured to:

compare the sensed motion activity to a criterion of motion activity corresponding to the second action; and conclude the second action has occurred when the criterion is satisfied.

17. The system of claim 13, wherein the means for detecting a present non-physical encounter is configured to determine if an attribute of a person satisfies a criterion corresponding to a close spatial relationship between the user and the person.

18. The system of claim 13, wherein the means for determining if the present physical encounter is an initial encounter or a subsequent encounter is configured to:

compare an image of the person to images in a database of images of people previously encountered by the user;

conclude the present physical encounter is an initial encounter if the image of the person does not match an image in the database; and conclude the present physical encounter is a subsequent encounter if the image of the person does match an image in the database.

19. The system of claim 13, wherein the means for determining if the person is known by the user is configured to:

obtain a present attribute of the person; and scan a database of known persons for a tag associated with an attribute in the database that matches the present attribute of the person, wherein the tag indicates that the person is known by the user.

20. The system of claim 13, wherein the means for presenting information to the interface device is configured to scan a database for information associated with an attribute in the database that matches an attribute of the person, wherein the information includes at least one of an identification of the person and a summary of a previous encounter between the user and the person.

21. A system for managing information for an interface device, said system comprising:

a memory; and at least one processor coupled to the memory and configured to:

detect for a present physical encounter between a user of the interface device and a person;

detect for a non-physical encounter between the user and a person;

determine if a detected present physical encounter is an initial encounter or a subsequent encounter;

add content associated with the person to a database of previously encountered persons when the present physical encounter is an initial encounter;

determine if the person is known by the user when the present physical encounter is a subsequent encounter or a present non-physical encounter is detected; and present information to the interface device corresponding to the person when the person is not known by the user.

22. A computer program product for managing information for an interface device, said product comprising:

one or more non-transitory computer-readable medium comprising code for:

detecting for a present physical encounter between a user of the interface device and a person;

detecting for a non-physical encounter between the user and a person;

determining if a detected present physical encounter is an initial encounter or a subsequent encounter;

adding content associated with the person to a database of previously encountered persons when the present physical encounter is an initial encounter;

determining if the person is known by the user when the present physical encounter is a subsequent encounter or a present non-physical encounter is detected; and presenting information to the interface device corresponding to the person when the person is not known by the user.

23. The system of claim 21, wherein, to detect a present physical encounter, the at least one processor is configured to perform one or both of:
   determining if electrical activity sensed from a body part of the user is indicative of a first action of the user; and
   determining if motion activity sensed from a body part of the user is indicative of a second action of the user.

24. The system of claim 23, wherein, to determine if sensed electrical activity is indicative of a first action, the at least one processor is configured to:
   compare the sensed electrical activity to a criterion of electrical activity corresponding to the first action; and
   conclude the first action occurred when the criterion is satisfied.

25. The system of claim 23, wherein, to determine if sensed motion activity is indicative of a second action, the at least one processor is configured to:
   compare the sensed motion activity to a criterion of motion activity corresponding to the second action; and
   conclude the second action has occurred when the criterion is satisfied.

26. The system of claim 23, wherein the first action comprises gripping and the second action comprises up and down movement.

27. The system of claim 21, wherein, to detect a present non-physical encounter, the at least one processor is configured to determine if an attribute of a person satisfies a criterion corresponding to a close spatial relationship between the user and the person.

28. The system of claim 21, wherein the attribute comprises one or more of an image of the person or a sound of the person.

29. The system of claim 21, wherein, to determine if the present physical encounter is an initial encounter or a subsequent encounter, the at least one processor is configured to:
   compare an image of the person to images in a database of images of people previously encountered by the user;
   conclude the present physical encounter is an initial encounter if the image of the person does not match an image in the database; and
   conclude the present physical encounter is a subsequent encounter if the image of the person does match an image in the database.

30. The system of claim 21, wherein, to determine if the person is known by the user, the at least one processor is configured to:
   obtain a present attribute of the person; and
   scan a database of known persons for a tag associated with an attribute in the database that matches the present attribute of the person, wherein the tag indicates that the person is known by the user.

31. The system of claim 30, wherein the present attribute comprises at least one of an image of the person and a sound of the person.

32. The system of claim 21, wherein, to present information to the interface device, the at least one processor is configured to scan a database for information associated with an attribute in the database that matches an attribute of the person, wherein the information includes at least one of an identification of the person and a summary of a previous encounter between the user and the person.

33. The system of claim 32, wherein the information is presented as one or more of images, audio or video.

34. The computer program product of claim 22, wherein the code for detecting a present physical encounter is configured to perform one or both of:
   determining if electrical activity sensed from a body part of the user is indicative of a first action of the user; and
   determining if motion activity sensed from a body part of the user is indicative of a second action of the user.

35. The computer program product of claim 34, wherein the code for determining if sensed electrical activity is indicative of a first action is configured to:
   compare the sensed electrical activity to a criterion of electrical activity corresponding to the first action; and
   conclude the first action occurred when the criterion is satisfied.

36. The computer program product of claim 34, wherein the code for determining if sensed motion activity is indicative of a second action is configured to:
   compare the sensed motion activity to a criterion of motion activity corresponding to the second action; and
   conclude the second action has occurred when the criterion is satisfied.

37. The computer program product of claim 34, wherein the first action comprises gripping and the second action comprises up and down movement.

38. The computer program product of claim 22, wherein the code for detecting a present non-physical encounter is configured to determine if an attribute of a person satisfies a criterion corresponding to a close spatial relationship between the user and the person.

39. The computer program product of claim 22, wherein the attribute comprises one or more of an image of the person or a sound of the person.

40. The computer program product of claim 22, wherein the code for determining if the present physical encounter is an initial encounter or a subsequent encounter is configured to:
   compare an image of the person to images in a database of images of people previously encountered by the user;
   conclude the present physical encounter is an initial encounter if the image of the person does not match an image in the database; and
   conclude the present physical encounter is a subsequent encounter if the image of the person does match an image in the database.

41. The computer program product of claim 22, wherein the code for determining if the person is known by the user is configured to:
   obtain a present attribute of the person; and
   scan a database of known persons for a tag associated with an attribute in the database that matches the present attribute of the person, wherein the tag indicates that the person is known by the user.

42. The computer program product of claim 41, wherein the present attribute comprises at least one of an image of the person and a sound of the person.

43. The computer program product of claim 22, wherein the code for present information to the interface device is configured to scan a database for information associated with an attribute in the database that matches an attribute of the person, wherein the information includes at least one of an identification of the person and a summary of a previous encounter between the user and the person.

44. The computer program product of claim 43, wherein the information is presented as one or more of images, audio or video.

* * * * *